United States Patent
Tsukada et al.

(10) Patent No.: US 10,685,777 B2
(45) Date of Patent: Jun. 16, 2020

(54) THREE-PHASE AC REACTOR EASILY CONNECTABLE TO INPUT AND OUTPUT TERMINAL BLOCK AND MANUFACTURING METHOD THEREOF

(71) Applicant: FANUC CORPORATION, Yamanashi (JP)

(72) Inventors: Kenichi Tsukada, Yamanashi (JP); Kaname Matsumoto, Yamanashi (JP); Makoto Takeshita, Yamanashi (JP); Yuuichi Yamada, Yamanashi (JP); Masatomo Shirouzu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 236 days.

(21) Appl. No.: 15/711,218

(22) Filed: Sep. 21, 2017

(65) Prior Publication Data
US 2018/0090262 A1 Mar. 29, 2018

(51) Int. Cl.
*H01F 30/12* (2006.01)
*H01F 27/29* (2006.01)
(Continued)

(52) U.S. Cl.
CPC ............. *H01F 27/29* (2013.01); *H01F 27/24* (2013.01); *H01F 27/2823* (2013.01);
(Continued)

(58) Field of Classification Search
USPC .......... 336/5, 12, 15, 59, 170, 180, 183, 192
See application file for complete search history.

(56) References Cited

U.S. PATENT DOCUMENTS

| 3,213,397 A | 10/1965 | Broverman |
| 2006/0279393 A1* | 12/2006 | Shudarek ............... H01F 7/263 336/198 |

(Continued)

FOREIGN PATENT DOCUMENTS

| CN | 201765902 U | 3/2011 |
| CN | 202487364 U | 10/2012 |

(Continued)

OTHER PUBLICATIONS

English Abstract and Machine Translation for Chinese Publication No. 202487364 U, published Oct. 10, 2012, 5 pages.
(Continued)

*Primary Examiner* — Elvin G Enad
*Assistant Examiner* — Kazi S Hossain
(74) *Attorney, Agent, or Firm* — Fredrikson & Byron, P.A.

(57) ABSTRACT

A three-phase AC reactor according to an embodiment of the present invention includes an input and output terminal block; a peripheral iron core disposed under the input and output terminal block; and at least three iron-core coils each constituted of an iron core and a coil wound around the iron core, so as to contact an inner surface of the peripheral iron core or so as to be coupled to the inner surface. The at least three iron-core coils form gaps that can be magnetically coupled between two of the iron-core coils adjoining each other. The three-phase AC reactor includes a phase-based coil extending member unit that extends from coil end portions of the coils as base points to connection points of the input and output terminal block.

10 Claims, 16 Drawing Sheets

(51) Int. Cl.
  *H01F 27/28* (2006.01)
  *H01F 41/10* (2006.01)
  *H01F 37/00* (2006.01)
  *H01F 41/076* (2016.01)
  *H01F 27/24* (2006.01)
  *H02P 27/04* (2016.01)

(52) U.S. Cl.
  CPC ......... *H01F 27/2828* (2013.01); *H01F 37/00* (2013.01); *H01F 41/076* (2016.01); *H01F 41/10* (2013.01); *H02P 27/04* (2013.01)

(56) References Cited

U.S. PATENT DOCUMENTS

| | | | | |
|---|---|---|---|---|
| 2013/0200967 A1* | 8/2013 | Xu | ........................ | H01F 7/306 336/5 |
| 2014/0002229 A1* | 1/2014 | Xu | ........................ | H01F 7/263 336/210 |
| 2015/0102882 A1* | 4/2015 | Shudarek | ................ | H01F 37/00 336/10 |
| 2015/0179330 A1* | 6/2015 | Nakanoue | ............... | H01F 37/00 336/5 |
| 2017/0040099 A1* | 2/2017 | Bhide | ..................... | H01F 7/245 |

FOREIGN PATENT DOCUMENTS

| | | | |
|---|---|---|---|
| CN | 203351363 U | 12/2013 | |
| CN | 104376990 A | 2/2015 | |
| CN | 104471657 A | 3/2015 | |
| JP | 2009283706 A | 12/2009 | |
| JP | 2010157599 A | 7/2010 | |
| JP | 2010-252539 A | 11/2010 | |
| JP | 2012256807 A | 12/2012 | |
| JP | 2015-159657 A | 9/2015 | |
| JP | 2016-122830 A | 7/2016 | |
| WO | 2012157053 A1 | 11/2012 | |

OTHER PUBLICATIONS

English Abstract and Machine Translation for Japanese Publication No. 2016-122830 A, published Jul. 7, 2016, 27 pages.
English Abstract and Machine Translation for Japanese Publication No. 2010-252539 A, published Nov. 4, 2010, 18 pages.
English Abstract and Machine Translation for Japanese Publication No. 2015-159657 A, published Sep. 3, 2015, 61 pages.
English Abstract and Machine Translation for Chinese Publication No. 104376990 A, published Feb. 25, 2015, 4 pages.
English Abstract for Chinese Publication No. 203351363 U, published Dec. 18, 2013, 1 page.
English Abstract and Machine Translation for Japanese Publication No. 2010-157599 A, published Jul. 15, 2010, 29 pgs.
English Abstract and Machine Translation for Japanese Publication No. 2012-256807 A, published Dec. 27, 2012, 100 pgs.
English Abstract and Machine Translation for Japanese Publication No. 2009-283706 A, published Nov. 3, 2009, 12 pgs.
English Machine Translation and Abstract for International Publication No. WO2012/157053 A1, published Nov. 22, 2012, 21 pgs.
Untranslated Decision to Grant a Patent mailed by Japan Patent Office (JPO) for Application No. JP 2016-185583, dated May 21, 2019, 3 pgs.
English Machine Translation of Decision to Grant a Patent mailed by Japan Patent Office (JPO) for Application No. JP 2016-185583, dated May 21, 2019, 2 pgs.
Untranslated Notice of Reasons for Refusal mailed by Japan Patent Office (JPO) for Application No. JP 2016-185583, dated Nov. 6, 2018, 4 pgs.
English Machine Translation of Notice of Reasons for Refusal mailed by Japan Patent Office (JPO) for Application No. JP 2016-185583, dated Nov. 6, 2018, 3 pgs.
Untranslated Notice of Reasons for Refusal mailed by Japan Patent Office (JPO) for Application No. JP 2016-185583, dated Jan. 29, 2019, 4 pgs.
English Machine Translation of Notice of Reasons for Refusal mailed by Japan Patent Office (JPO) for Application No. JP 2016-185583, dated Jan. 29, 2019, 3 pgs.
English Abstract and Machine Translation for Chinese Publication No. 201765902 U, published Mar. 16, 2011, 4 pgs.
English Abstract and Machine Translation for Chinese Publication No. 104471657 A, published Mar. 25, 2015, 19 pgs.

* cited by examiner

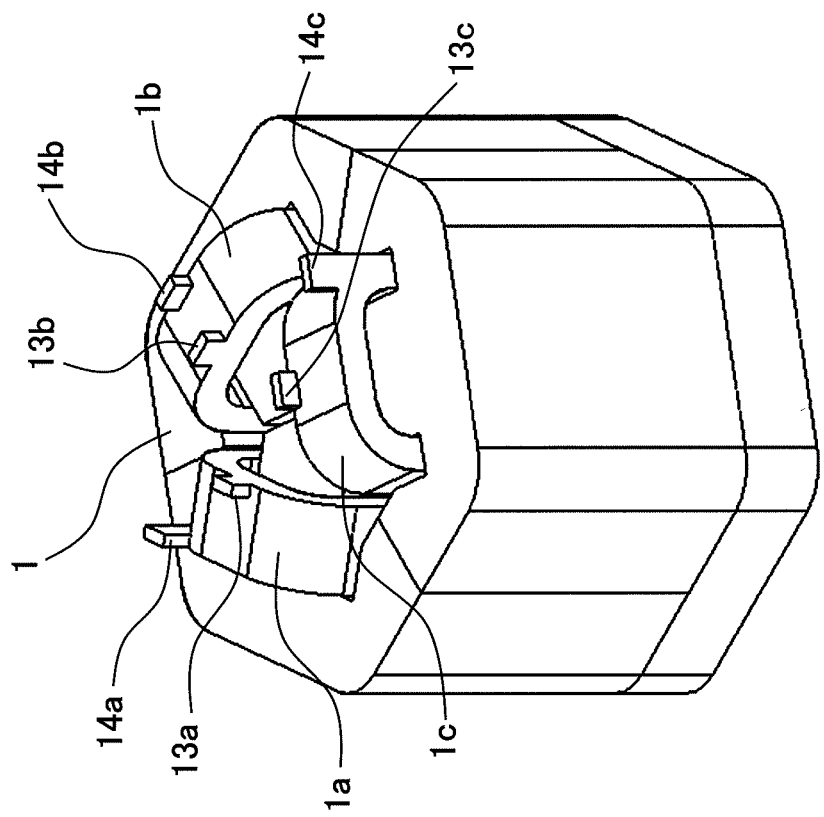
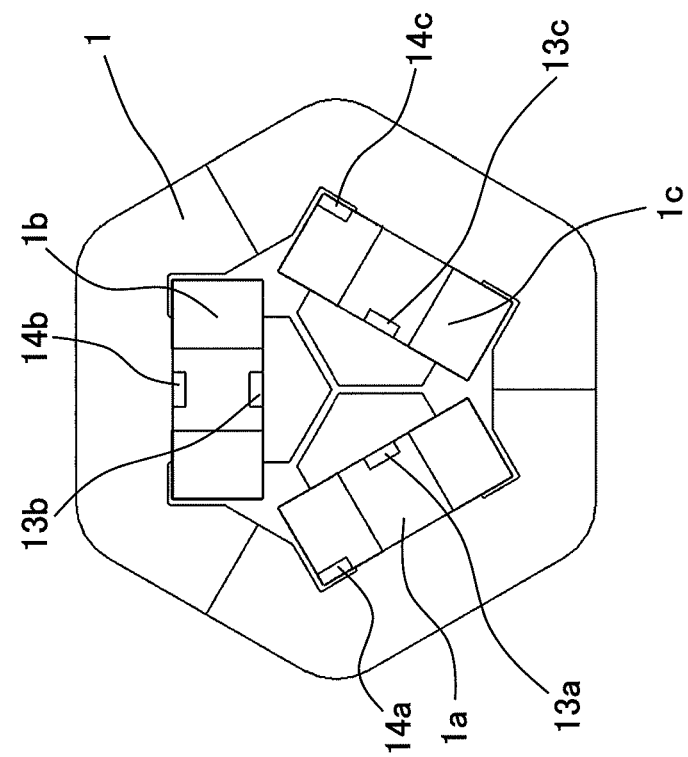
FIG. 1A
FIG. 1B

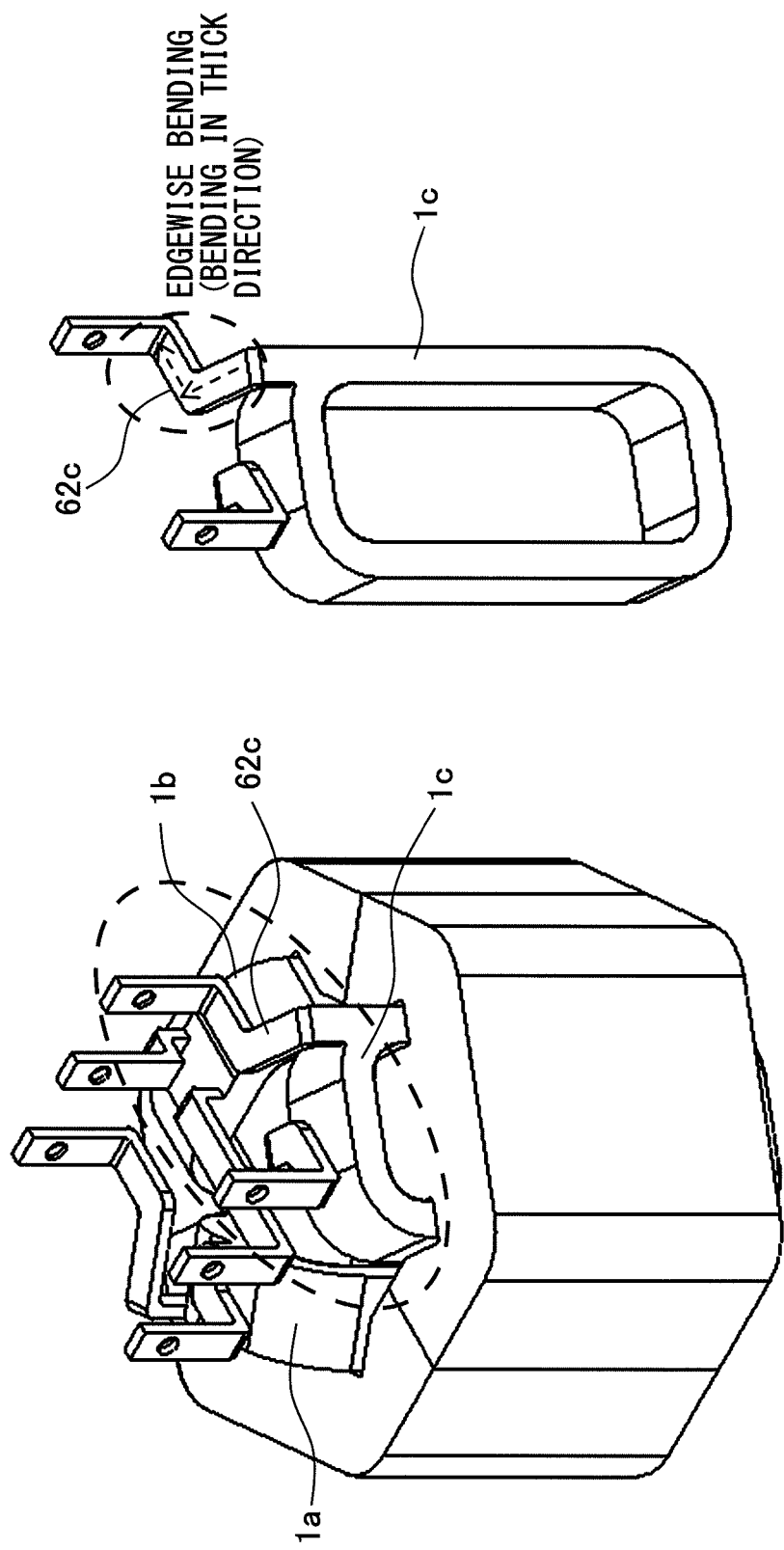

THREE-PHASE AC REACTOR EASILY CONNECTABLE TO INPUT AND OUTPUT TERMINAL BLOCK AND MANUFACTURING METHOD THEREOF

This application is a new U.S. patent application that claims benefit of JP 2016-185583 filed on Sep. 23, 2016, the content of 2016-185583 is incorporated herein by reference.

BACKGROUND OF THE INVENTION

1. Field of the Invention

The present invention relates to a three-phase AC reactor and a manufacturing method thereof, and specifically relates to a three-phase AC reactor that has a coil extending member unit that extends from coil end portions of wound coils as base points to connection points of an input and output terminal block.

2. Description of Related Art

Alternating current (AC) reactors are used in order to reduce harmonic current occurring in inverters and the like, to improve input power factors, or to reduce inrush current to inverters. AC reactors have cores made of a magnetic material and a coil formed around the core.

FIG. 15 shows the structure of a conventional three-phase AC reactor (for example, Japanese Unexamined Patent Publication (Kokai) No. 2009-283706). A conventional three-phase AC reactor 1000 includes three-phase coils 101a, 101b, and 101c aligned in the directions of the double-headed arrow of FIG. 15. The coils 101a, 101b, and 101c have output terminals 210a, 210b, and 210c, and input terminals 220a, 220b, and 220c, respectively. In the conventional three-phase AC reactor, as shown in FIG. 15, the three-phase coils are arranged (apposed) in parallel and in a linear manner so as to align the three-phase coils and the input and output terminals. Thus, it is easy to connect a general-purpose input and output terminal block having linearly arranged input and output terminals to the input and output terminals of the three-phase AC reactor.

However, in recent years, three-phase AC reactors having three-phase coils that are arranged (apposed) neither in parallel nor in a linear manner are reported (for example, International Publication No. 2012/157053). FIG. 16A is a perspective view of a conventional reactor device, and FIG. 16B is a plan view of the conventional reactor device. A conventional reactor device 2000 includes yoke cores 911a and 911b, three magnetic leg cores 931, three zero-phase magnetic leg cores 941, and three coils 921. The three coils 921 are disposed, for example, 120 degrees apart from each other with respect to the central axis of the yoke core 911a.

To connect a general-purpose input and output terminal block to such a three-phase AC reactor, bus bars or cables are required to connect between coil ends and the input and output terminal block. The coil ends that are arranged (apposed) neither in parallel nor in a linear manner cause difficulty in connection to the general-purpose input and output terminal block and hence connection to an external device. There are also concerns about an increase in production man-hours and the occurrence of operation errors. When the short bars or cables are used for changing connection positions to the terminal block, a plurality of types of relay member units have to be prepared depending on a variety of sizes of the three-phase AC reactors, thus requiring time, effort, and cost for management.

SUMMARY OF THE INVENTION

The purpose of the present invention is to be able to manufacture a three-phase AC reactor that is easily connected to an external device with less man-hours than before, even if the three-phase coils are arranged (apposed) neither in parallel nor in a linear manner.

A three-phase AC reactor according to the present invention includes an input and output terminal block; a peripheral iron core disposed under the input and output terminal block; and at least three iron-core coils each constituted of an iron core and a coil wound around the iron core, so as to contact an inner surface of the peripheral iron core or so as to be coupled to the inner surface. The at least three iron-core coils form gaps that can be magnetically coupled between two of the iron-core coils adjoining each other. The three-phase AC reactor includes a phase-based coil extending member unit that extends from coil end portions of the coils as base points to connection points of the input and output terminal block.

the method for manufacturing a three-phase AC reactor according to the present invention is a method for manufacturing a three-phase AC reactor that includes an input and output terminal block; a peripheral iron core disposed under the input and output terminal block; and at least three iron-core coils each constituted of an iron core and a coil wound around the iron core, so as to contact an inner surface of the peripheral iron core or so as to be coupled to the inner surface, the at least three iron-core coils forming gaps that can be magnetically coupled between two of the iron-core coils adjoining each other. The method includes the step of forming a coil extending member unit that extends from coil end portions of the coils as base points to connection points of the input and output terminal block.

BRIEF DESCRIPTION OF THE DRAWINGS

The objects, features, and advantages of the present invention will become more apparent from the following detailed description of an embodiment, along with the accompanying drawings. In the accompanying drawings:

FIG. 1A is a plan view of three-phase coils and a peripheral iron core that constitute a three-phase AC reactor according to an embodiment of the present invention;

FIG. 1B is a perspective view of the three-phase coils and the peripheral iron core that constitute the three-phase AC reactor according to the embodiment of the present invention;

FIG. 8A is a perspective view of the coil extending member unit, the three-phase coils, and the peripheral iron core that constitute the three-phase AC reactor according to the embodiment of the present invention;

FIG. 8B is a perspective view of one of the coils that constitute the three-phase AC reactor according to the embodiment of the present invention;

DETAILED DESCRIPTION OF THE INVENTION

Figure 17:
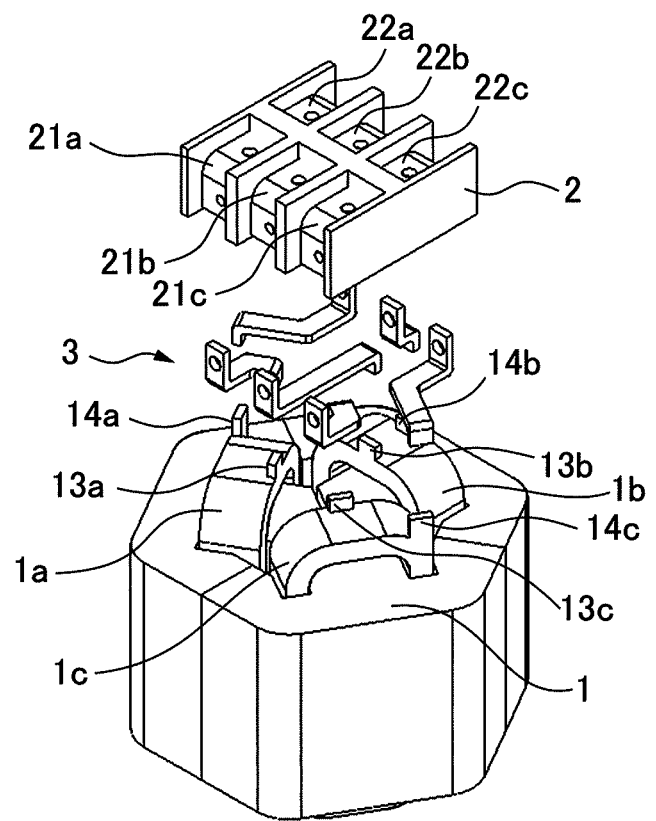
FIG. 17 is a perspective view of an input and output terminal block, a relay member unit, and three-phase coils that constitute a three-phase AC reactor in which the three-phase coils are not apposed.

A three-phase AC reactor according to the present invention will be described below with reference to the drawings. A method for connecting an input and output terminal block to a three-phase AC reactor having three-phase coils arranged (apposed) neither in parallel nor in a linear manner using a relay member unit will be first described. FIG. 17 is a perspective view of an input and output terminal block 2, a relay member unit 3, and three-phase coils (1a, 1b, and 1c) that constitute a three-phase AC reactor in which the three-phase coils are not apposed and the first to third coils (1a, 1b, and 1c) are contained in a peripheral iron core 1. An output terminal 13a of the first coil (e.g., R-phase coil) 1a, an output terminal 13b of the second coil (e.g., S-phase coil) 1b, and an output terminal 13c of the third coil (e.g., T-phase coil) 1c are not apposed. In the same manner, an input terminal 14a of the first coil 1a, an input terminal 14b of the second coil 1b, and an input terminal 14c of the third coil 1c are not apposed. The output terminals may also be referred to as output coil ends (coil end portions), and the input terminals may also be referred to as input coil ends (coil end portions).

As shown in FIG. 17, the input and output terminal block 2 includes input and output terminals having connection points (21a, 21b, 21c, 22a, 22b, and 22c) arranged (apposed) in parallel and in a linear manner. To be more specific, the connection point 21a of the first output terminal, the connection point 21b of the second output terminal, and the connection point 21c of the third output terminal are arranged in a straight line, while the connection point 22a of the first input terminal, the connection point 22b of the second input terminal, and the connection point 22c of the third input terminal are arranged in another straight line. The two straight lines are arranged (apposed) in parallel.

Since the input and output terminals of the input and output terminal block 2 are apposed, though the input and output terminals of the coils 1a to 1c are not apposed, it is necessary to connect both of the terminals of the relay member unit 3. However, the provision of the relay member unit 3 requires increased manufacturing cost. The variety of the relay member units 3 is increased depending on the variety of coil sizes. Furthermore, the number of man-hours required to connect the relay member unit is increased.

Figure 2:
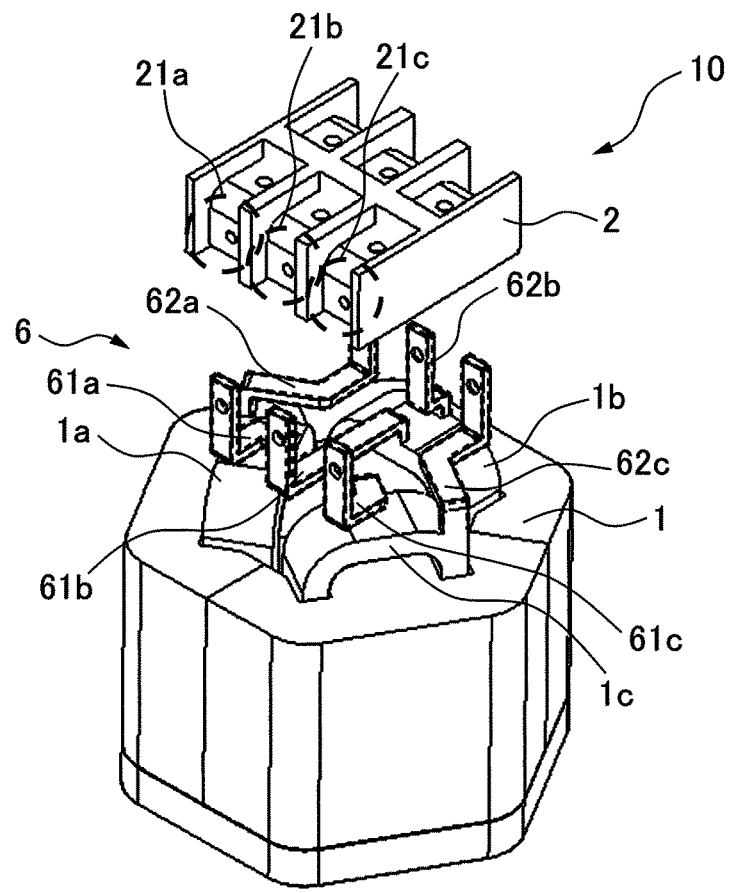
FIG. 2 is a perspective view of an input and output terminal block, a coil extending member unit, the three-phase coils, and the peripheral iron core that constitute the three-phase AC reactor according to the embodiment of the present invention.
Figure 3:
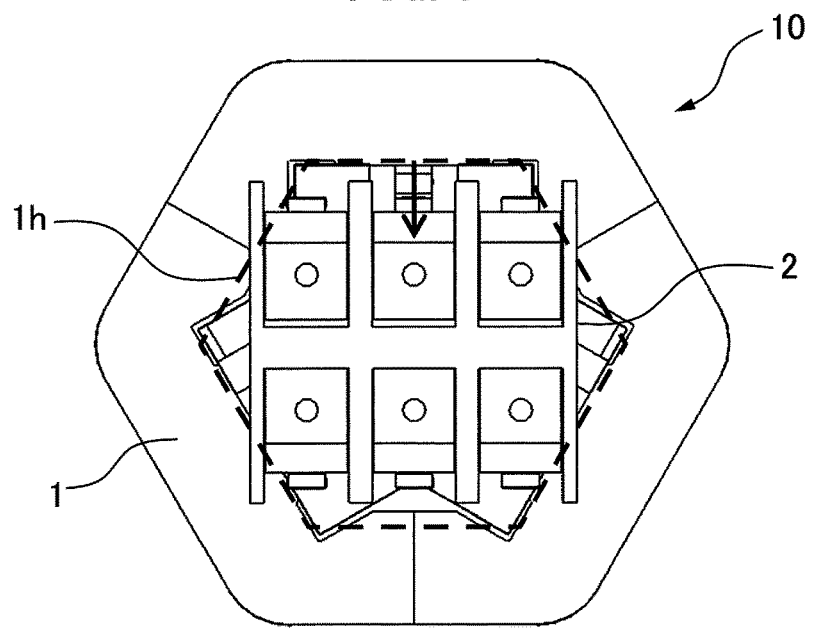
FIG. 3 is a plan view of the input and output terminal block and the peripheral iron core that constitute the three-phase AC reactor according to the embodiment of the present invention.

A three-phase AC reactor according to the present invention is intended to solve the above problems, and the three-phase AC reactor that can be easily connected to an external device is manufactured with less man-hours than before. FIG. 1A is a plan view of three-phase coils and a peripheral iron core that constitute a three-phase AC reactor according to an embodiment of the present invention. FIG. 1B is a perspective view of the three-phase coils and the peripheral iron core that constitute the three-phase AC reactor according to the embodiment of the present invention. FIGS. 2 and 3 are a perspective view and a plan view that show an input and output terminal block, a coil extending member unit, the three-phase coils, and the peripheral iron core that constitute the three-phase AC reactor according to the embodiment of the present invention, respectively.

A three-phase AC reactor 10 according to the embodiment of the present invention has an input and output terminal block 2, a peripheral iron core 1, and at least three iron-core coils (hereinafter also simply referred to as "coils") (1a, 1b, and 1c). The peripheral iron core 1 is disposed under the input and output terminal block 2. The at least three iron-core coils (1a, 1b, and 1c) are each constituted of an iron core and a coil wound around the iron core, so as to contact an inner surface of the peripheral iron core 1 or so as to be coupled to the inner surface. The at least three iron-core coils (1a, 1b, and 1c) form gaps that can be magnetically coupled between two of the coils adjoining each other.

As shown in FIG. 2, the three-phase AC reactor 10 according to the embodiment of the present invention has a phase-based coil extending member unit 6 that extends from coil end portions (coil ends) (13a, 13b, 13c, 14a, 14b, and 14c (refer to FIG. 1)) as base points to connection points (21a, 21b, 21c, 22a, 22b, and 22c) of the input and output terminal block.

The structure of the coil used in the three-phase AC reactor according to the embodiment of the present invention will first be described. In FIGS. 1A and 1B, the coil extending member unit 6 is removed for the sake of clarity of the positions of coil ends. As shown in FIG. 1A, in the three-phase AC reactor according to the embodiment of the present invention, the three-phase coils (1a, 1b, and 1c) are arranged (apposed) neither in parallel nor in a linear manner. As shown in FIG. 1B, which is a perspective view of the three-phase coils and the peripheral iron core constituting the three-phase AC reactor according to the embodiment of the present invention, the three-phase coils (1a, 1b, and 1c) are contained in the peripheral iron core 1. The first coil 1a has a first output coil end 13a and a first input coil end 14a. The second coil 1b has a second output coil end 13b and a second input coil end 14b. The third coil 1c has a third output coil end 13c and a third input coil end 14c. For example, the first coil 1a may be an R-phase coil, the second coil 1b may be an S-phase coil, and the third coil 1c may be a T-phase coil. The "coil end" refers to an end portion of the coil. In this embodiment, however, each coil end is integrated with the coil extending member unit 6.

As shown in FIGS. 2 and 3, the coil extending member unit 6 directly connects the coils to the input and output terminal block 2, without the use of a relay member unit. As a result, it is possible to prevent a connection error between an external device and the input and output terminal block, and allows a reduction in manufacturing cost due to elimination of the relay member unit (short bars and the like). The input and output terminal block 2 can be disposed in the middle of the three-phase AC reactor. More specifically, as shown in FIG. 3, the input and output terminal block 2 can be disposed in the middle of a periphery 1h of the peripheral iron core 1.

In the three-phase AC reactor, as shown in FIG. 2, the coil extending member unit 6 can be divided into six component parts. Reference numeral 61a indicates an output coil extending member for the R-phase coil 1a, and reference numeral 62a indicates an input coil extending member for the R-phase coil 1a. Reference numeral 61b indicates an output coil extending member for the S-phase coil 1b, and reference numeral 62b indicates an input coil extending member for the S-phase coil 1b. Reference numeral 61c indicates an output coil extending member for the T-phase coil 1c, and reference numeral 62c indicates an input coil extending member for the T-phase coil 1c. The coil extending members (61a, 62a, 61b, 62b, 61c, and 62c) extend from the coil ends (13a, 14a, 13b, 14b, 13c, and 14c (see FIG. 1)), respectively.

Figure 9:
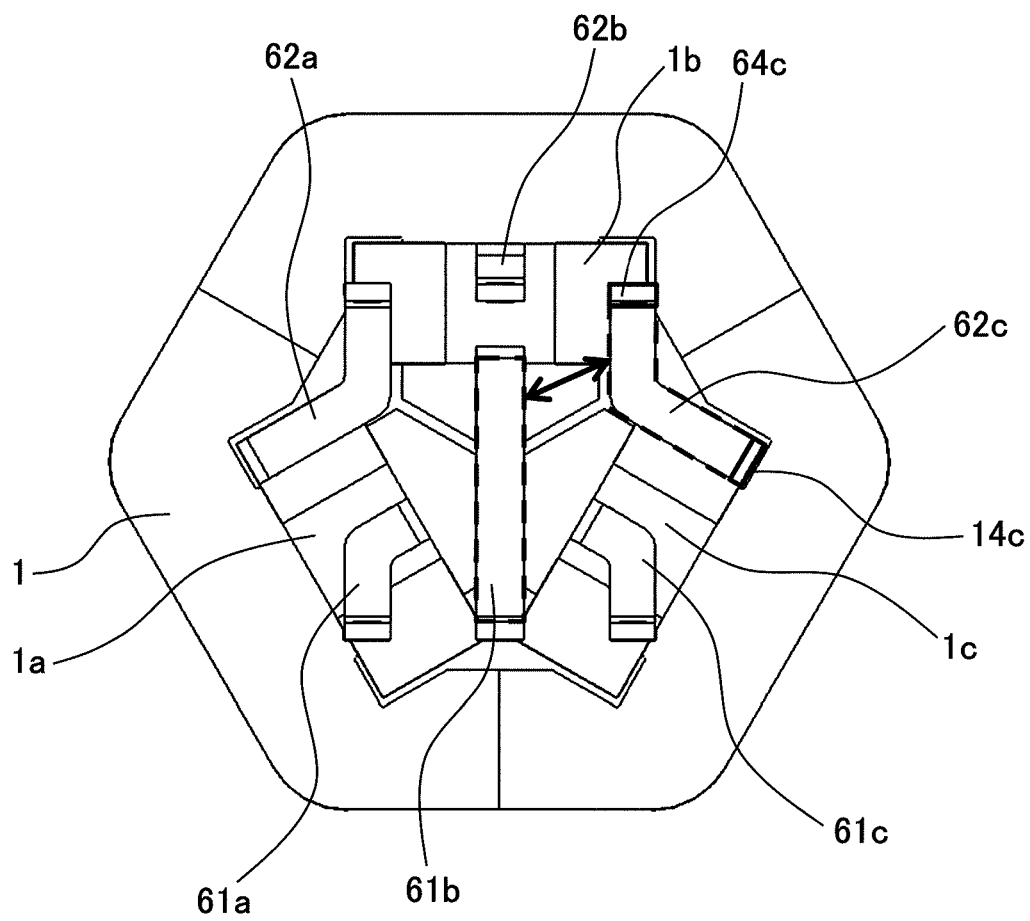
FIG. 9 is a plan view of the coil extending member unit, the three-phase coils, and the peripheral iron core that constitute the three-phase AC reactor according to the embodiment of the present invention.
Figure 12:
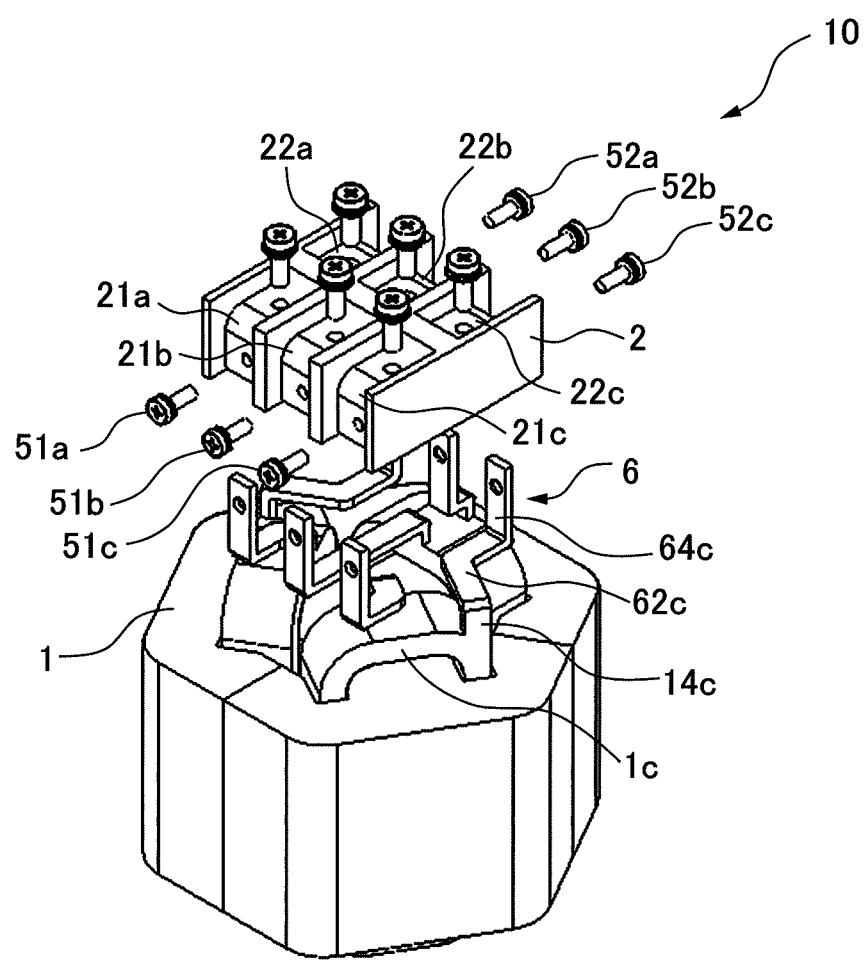
FIG. 12 is a perspective view of the input and output terminal block, the coil extending member unit, the three-phase coils, and the peripheral iron core before assembly that constitute the three-phase AC reactor according to the embodiment of the present invention.

As shown in FIGS. 9 and 12, the coil extending member 62c is formed between the coil end 14c of the third coil 1c, i.e., the T-phase coil and a terminal (terminal portion) 64c to be connected to the input and output terminal block. Each of the other coil extending members is connected in the same manner between the coil end of each phase and a connection portion to be connected to the input and output terminal block.

Figure 10:
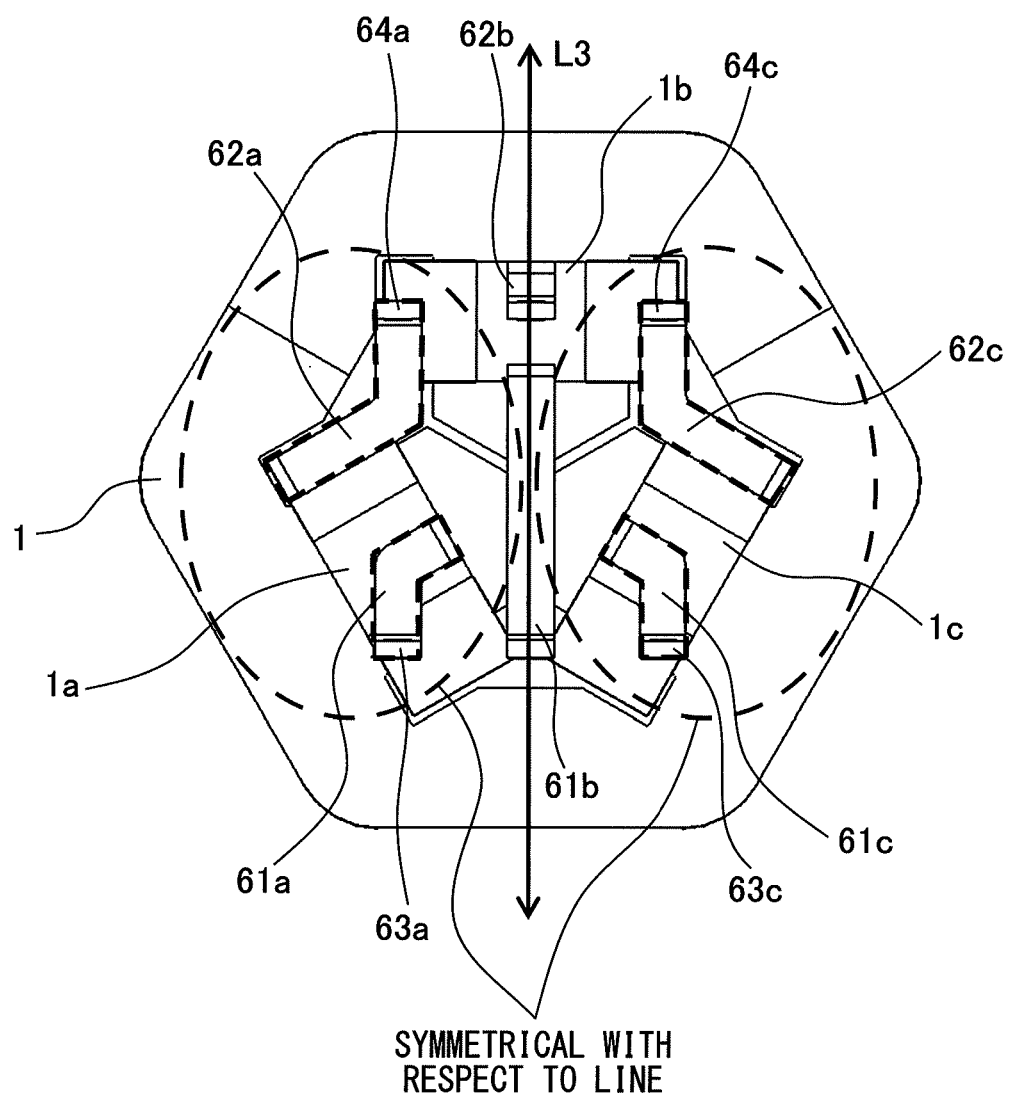
FIG. 10 is a plan view of the coil extending member unit, the three-phase coils, and the peripheral iron core that constitute the three-phase AC reactor according to the embodiment of the present invention.

Each coil extending member may be formed by bending each coil. More specifically, as indicated by the broken line in FIG. 2, coils extending in a vertical direction in parallel with the central axis of the three-phase AC reactor may be bent perpendicularly and then bent in the vertical direction, to form each coil extending member. Of the two bending steps of the coil, as described above, the first bending step is referred to as "first bending". As shown in FIG. 10, the coil extending member unit 6 is preferably symmetrical with respect to a third straight line L3 that passes through the centers of the coil extending members (61b and 62b) of the S-phase coil 1b, in a plane formed by the first bending. In other words, the coil extending member 61a is preferably symmetrical to the coil extending member 61c with respect to the third straight line L3. The coil extending member 62a is preferably symmetrical to the coil extending member 62c with respect to the third straight line L3. Furthermore, the coil extending members are preferably formed in the same plane.

The coil extending members (61a, 62a, 61b, 62b, 61c, and 62c) of each phase are preferably in forms that do not overlap each other. FIG. 9 is a plan view of the coil extending member unit, the three-phase coils, and the peripheral iron core that constitute the three-phase AC reactor according to the embodiment of the present invention. At this time, which of the two coil end portions of the coil is connected to which of the input and output connection points of the input and output terminal block is determined such that the sum of the distances between each of the two coil end portions and each of the connection points becomes lower (details will be described later).

As shown in FIG. 9, the input coil extending member 62c of the T-phase coil is formed between the coil end 14c and the terminal portion 64c of the coil extending member so as to be a certain distance away from the output coil extending member 61b of the S-phase coil, as indicated by the double-headed arrow. In the same manner, each coil extending member is formed so as to be a certain distance away from the other coil extending members. This structure easily ensures the insulation distances between the coil extending members.

Next, the positional relationship between the input and output terminal block 2 and the peripheral iron core 1 will be described in the three-phase AC reactor according to this embodiment of the present invention. FIG. 3 is a plan view of the input and output terminal block 2 and the peripheral iron core 1 that constitute the three-phase AC reactor according to the embodiment of the present invention. In the three-phase AC reactor according to the embodiment of the present invention, the input and output terminal block 2 is preferably disposed on a radially inner side of the peripheral iron core 1. In other words, as shown in FIG. 3, the input and output terminal block 2 is preferably disposed in an area indicated by broken line 1h on a radially inner side of the peripheral iron core 1. This structure makes it possible to dispose the input and output terminal block in the middle of the three-phase AC reactor, and reduce the width of the three-phase AC reactor, thus contributing to a size reduction.

Figure 4:
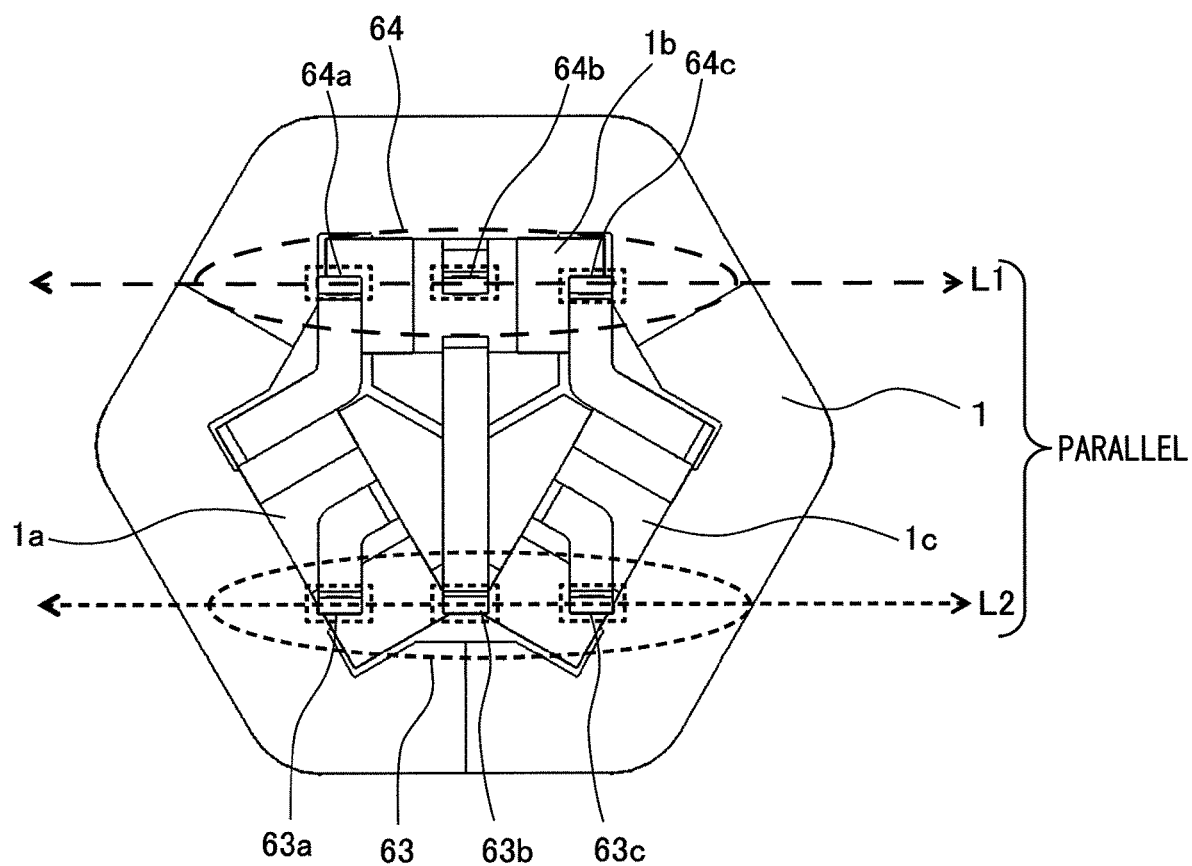
FIG. 4 is a plan view of the coil extending member unit, the three-phase coils, and the peripheral iron core that constitute the three-phase AC reactor according to the embodiment of the present invention.

Next, the positional relationship of the terminal portions of the coil extending member unit in the three-phase AC reactor according to the embodiment of the present invention will be described. FIG. 4 is a plan view of the coil extending member unit, the three-phase coils, and the peripheral iron core that constitute the three-phase AC reactor according to the embodiment of the present invention. In the three-phase AC reactor according to the embodiment of the present invention, the terminal portions (64a, 64b, and 64c) of the three input coil extending members are preferably arranged in a first straight line L1. The terminal portions (63a, 63b, and 63c) of the three output coil extending members are preferably arranged in a second straight line L2. The first straight line L1 and the second straight line L2 are preferably in parallel. As shown in FIG. 4, the terminal portions (64a, 64b, and 64c) of the three input coil extending members are arranged in the first straight line L1 within the long dashed line 64. In the same manner, the terminal portions (63a, 63b, and 63c) of the three output coil extending members are arranged in the second straight line L2 within the short dashed line 63. Furthermore, the first straight line L1 and the second straight line L2 are preferably in parallel. This structure allows easy connection between each of the terminal portions of the coil extending member unit and the input and output terminal block.

Figure 5B:
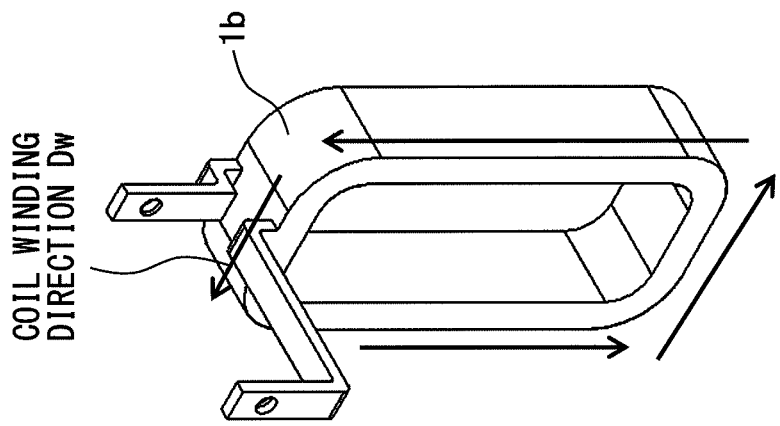
FIG. 5B is a perspective view of one of the coils that constitute the three-phase AC reactor according to the embodiment of the present invention.
Figure 5A:
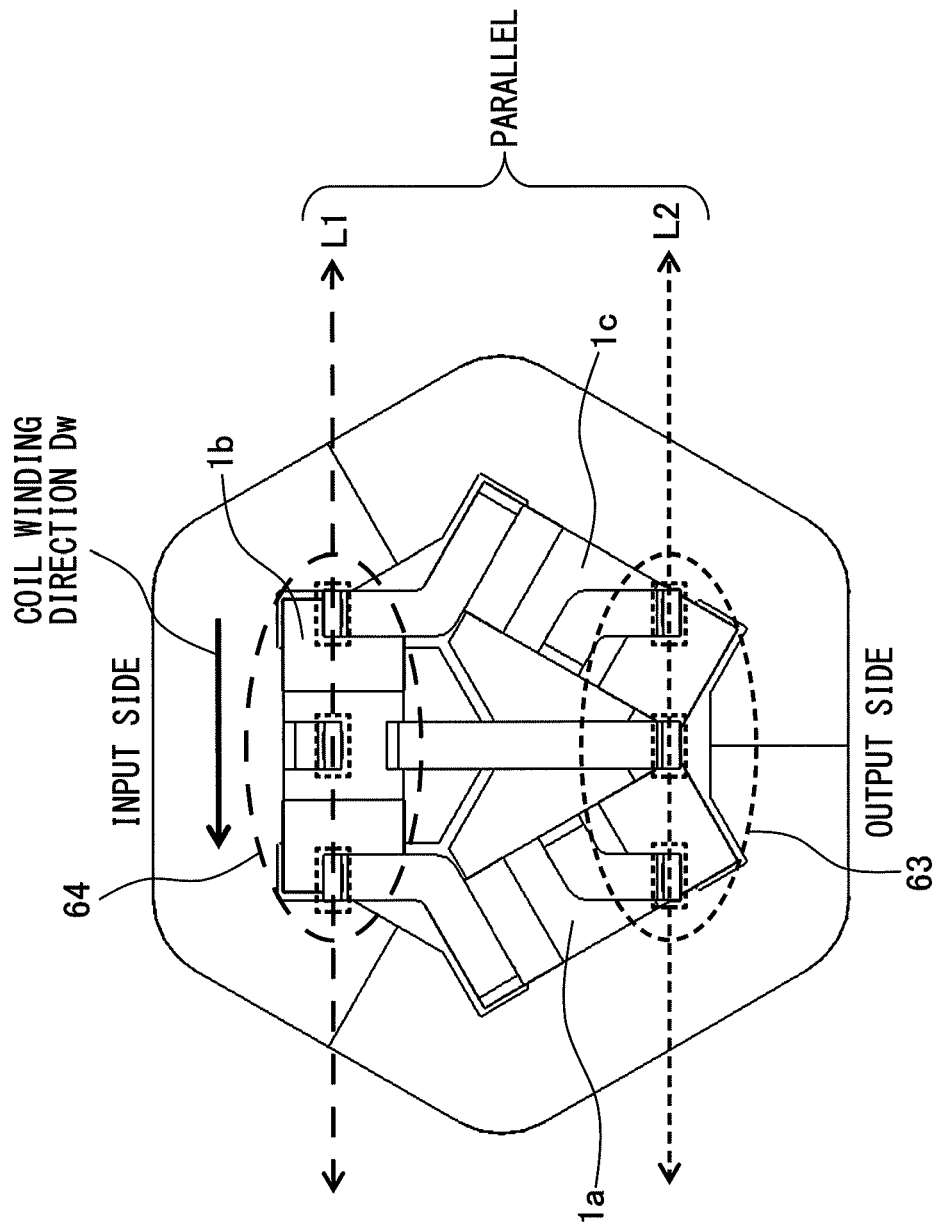
FIG. 5A is a plan view of the three-phase coils, the coil extending member unit, and the peripheral iron core that constitute the three-phase AC reactor according to the embodiment of the present invention.

FIG. 5A is a plan view of the three-phase coils, the coil extending member unit, and the peripheral iron core that constitute the three-phase AC reactor according to the embodiment of the present invention. FIG. 5B is a perspective view of one of the coils. In the three-phase AC reactor according to the embodiment of the present invention, the first straight line L1 and the second straight line L2 are preferably in parallel with the winding direction Dw of one of the coils. This structure allows a reduction in the number of man-hours for bending the terminal portions.

Figure 6:
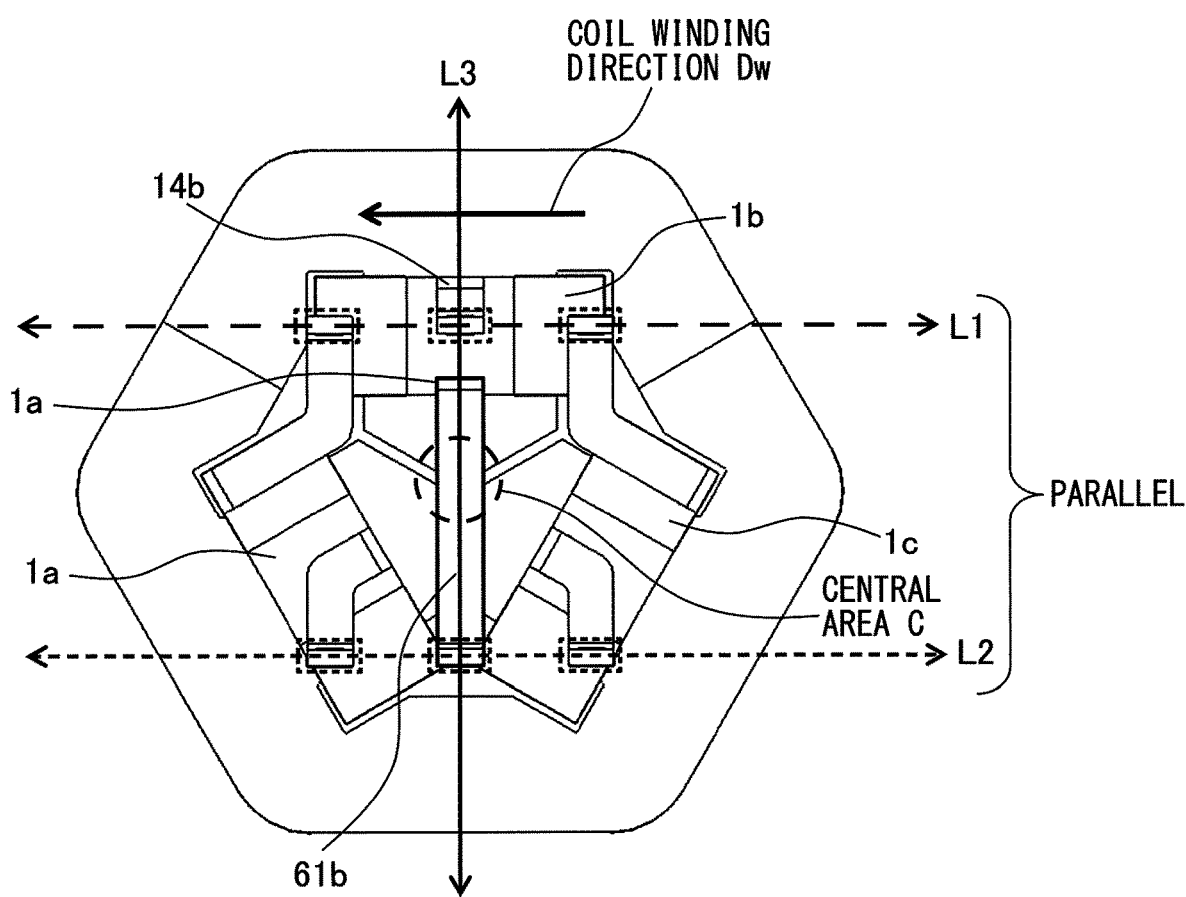
FIG. 6 is a plan view of the three-phase coils and the peripheral iron core that constitute the three-phase AC reactor according to the embodiment of the present invention.

FIG. 6 is a plan view of the three-phase coils and the peripheral iron core that constitute the three-phase AC reactor according to the embodiment of the present invention. In the three-phase AC reactor according to the embodiment of the present invention, the coil end portions (13b and 14b) of the coil 1b that is in parallel with the first straight line L1 and the second straight line L2 are preferably arranged in a central area C of the three-phase AC reactor and in the third straight line L3. This structure allows disposing the coil extending member unit 6 in the center of the input and output terminal block 2.

Figure 7A:
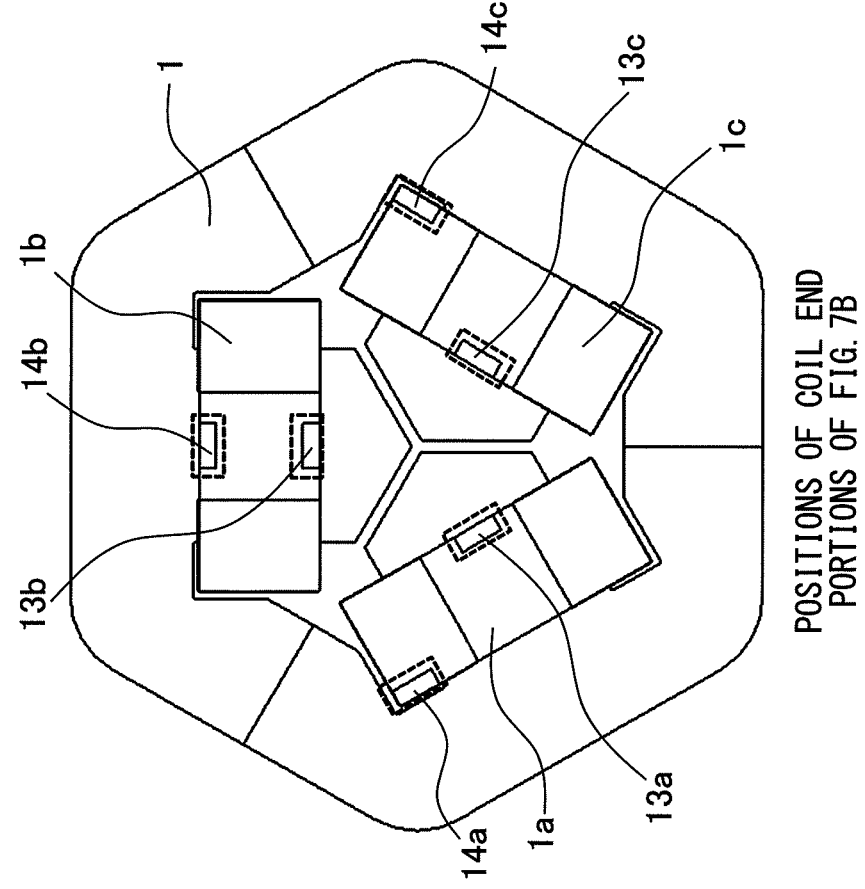
FIG. 7A is a plan view of the three-phase coils and the peripheral iron core that constitute the three-phase AC reactor according to the embodiment of the present invention.
Figure 7B:
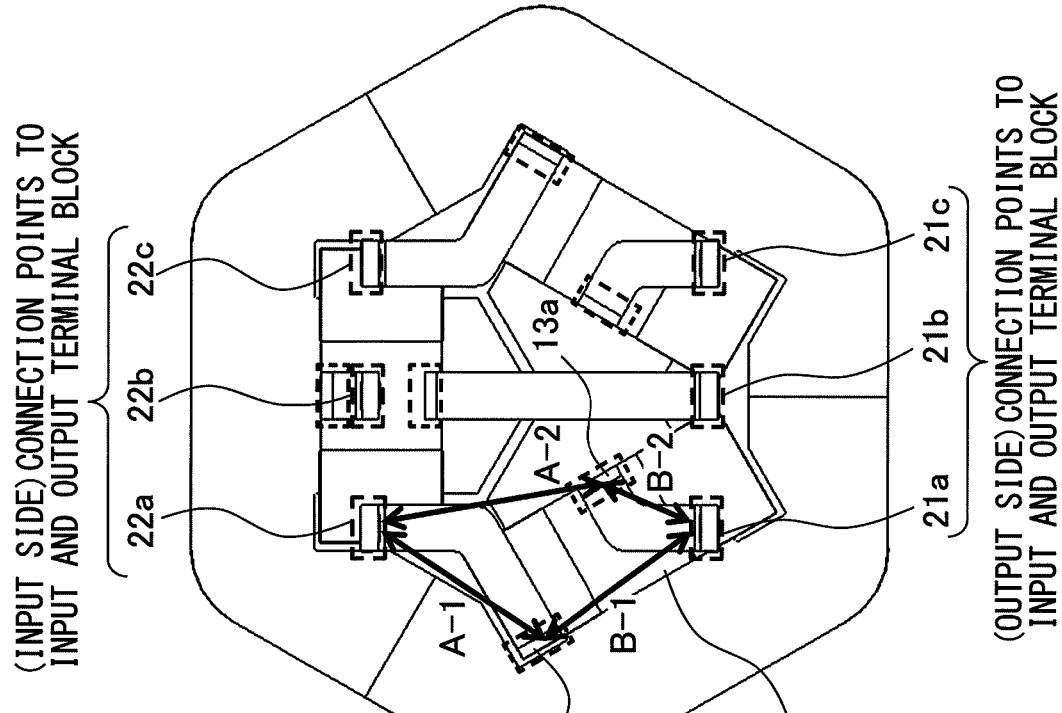
FIG. 7B is a plan view of the three-phase coils, the coil extending member unit, and the peripheral iron core that constitute the three-phase AC reactor according to the embodiment of the present invention.

FIG. 7A is a plan view of the three-phase coils and the peripheral iron core that constitute the three-phase AC reactor according to the embodiment of the present invention. FIG. 7B is a plan view of the coil extending member unit, the three-phase coils, and the peripheral iron core that constitute the three-phase AC reactor according to the embodiment of the present invention. In FIG. 7B, the positions of the output connection points (21a, 21b, and 21c) and the input connection points (22a, 22b, and 22c) of the input and output terminal block 2 (see FIG. 2) are indicated by broken lines. In the three-phase AC reactor according to the embodiment of the present invention, for example, which of the two coil end portions (13a and 14a) of the coil 1a is connected to which of the input connection point 22a and the output connection point 21a of the input and output terminal block 2 is preferably determined such that the sum of the distances between each of the two coil end portions (13a and 14a) and each of the connection points (21a and 22a) becomes lower. For example, "A-1" refers to the distance between the coil end portion 14a of the R-phase coil 1a and the input connection point 22a, and "A-2" refers to the distance between the coil end portion 13a of the R-phase coil 1a and the input connection point 22a. "B-1" refers to the distance between the coil end portion 14a of the R-phase coil 1a and the output connection point 21a, and "B-2" refers to the distance between the coil end portion 13a of the R-phase coil 1a and the output connection point 21a. At this time, as shown in FIG. 7B, when the coil extending members are provided between the coil end portion 14a and the input connection point 22a and between the coil end portion 13a and the output connection point 21a, the sum of the distances is (A-1)+(B-2). On the other hand, when the coil extending members are provided between the coil end portion 13a and the input connection point 22a and between the coil end portion 14a and the output connection point 21a, the sum of the distances is (A-2)+(B-1). Thus, by comparing both of the sums, the coil extending members are provided so as to make the sum lower. As for the S-phase coil 1b and the T-phase coil 1c, the coil extending members are provided in the same manner. This structure can reduce redundancy in the coil extending members, thus facilitating a reduction in the cost of the coil extending member unit.

FIG. 8A is a perspective view of the coil extending member unit, the three-phase coils, and the peripheral iron core that constitute the three-phase AC reactor according to the embodiment of the present invention. FIG. 8B is a perspective view of one of the coils. In the three-phase AC reactor according to the embodiment of the present invention, for example, the coil extending member 62c is preferably bent edgewise. "Edgewise bending" refers to bending in a thick direction of the coil extending member 62c, as indicated by the arrows of FIG. 8B. This structure allows a reduction in the number of man-hours for bending the coil extending member unit.

FIG. 9 is a plan view of the coil extending member unit, the three-phase coils, and the peripheral iron core that constitute the three-phase AC reactor according to the embodiment of the present invention. In the three-phase AC reactor according to the embodiment of the present invention, the coil extending members of each phase are preferably in forms that do not overlap each other. To be more specific, for example, as shown in FIG. 9, the coil extending member 61b of the S-phase coil 1b and the coil extending member 62c of the T-phase coil 1c preferably do not overlap. In the same manner, the other coil extending members (61a, 62a, 62b, and 61c) preferably do not overlap each other. This structure prevents an increase in the height of the coil extending member unit, thus easily ensuring the insulation distances between the coil extending members.

FIG. 10 is a plan view of the coil extending member unit, the three-phase coils, and the peripheral iron core that constitute the three-phase AC reactor according to the embodiment of the present invention. In the three-phase AC reactor according to the embodiment of the present invention, the terminal portions of the coil extending member unit are preferably symmetrical with respect to the third straight line L3. More specifically, the terminal portion 63a of the coil extending member 61a is preferably symmetrical with the terminal portion 63c of the coil extending member 61c. The terminal portion 64a of the coil extending member 62a is preferably symmetrical with the terminal portion 64c of the coil extending member 62c. This structure allows commonality of facilities for the bend process of the coil extending member units.

Figure 11:
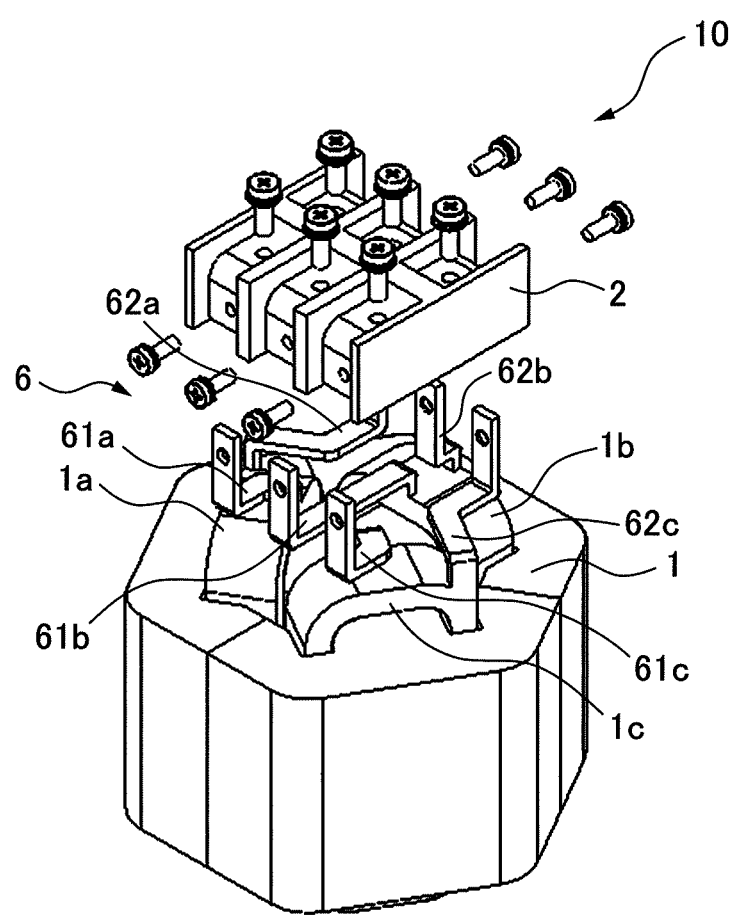
FIG. 11 is a perspective view of the input and output terminal block, the coil extending member unit, the three-phase coils, and the peripheral iron core that constitute the three-phase AC reactor according to the embodiment of the present invention.

Next, the material and type of the coils will be described in the three-phase AC reactor according to the embodiment of the present invention. FIG. 11 is a perspective view of the input and output terminal block 2, the coil extending member unit 6, the three-phase coils (1a, 1b, and 1c), and the peripheral iron core 1 that constitute the three-phase AC reactor 10 according to the embodiment of the present invention. In the three-phase AC reactor according to the embodiment of the present invention, the at least three iron-core coils (1a, 1b, and 1c) functioning as the three-phase coils are preferably made of copper or aluminum. The at least three iron-core coils (1a, 1b, and 1c) functioning as the three-phase coils are preferably made from rectangular wires, round wires, or Litz wires. Choosing the material and type of the coils, as described above, allows manufacturing the three-phase AC reactor with high performance at low cost.

The above-described three-phase AC reactor may be provided in a motor driver. According to the motor driver of the embodiment of the present invention, even if the three-phase coils are arranged (apposed) neither in parallel nor in a linear manner, it is possible to obtain a motor driver having the three-phase AC reactor that can be easily connected to an external device.

Figure 13:
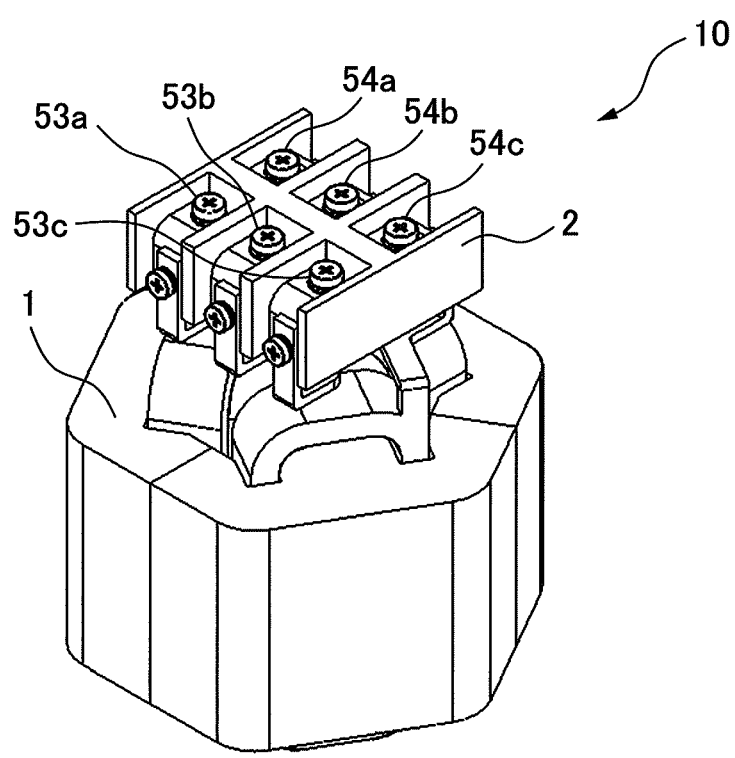
FIG. 13 is a perspective view of the input and output terminal block, the coil extending member unit, the three-phase coils, and the peripheral iron core after assembly that constitute the three-phase AC reactor according to the embodiment of the present invention.

Next, a method for manufacturing the three-phase AC reactor according to the embodiment of the present invention will be described. FIG. 12 is a perspective view of the input and output terminal block, the coil extending member unit, the three-phase coils, and the peripheral iron core before assembly that constitute the three-phase AC reactor according to the embodiment of the present invention, while FIG. 13 is a perspective view of the input and output terminal block, the coil extending member unit, the three-phase coils, and the peripheral iron core after assembly that constitute the three-phase AC reactor according to the embodiment of the present invention. The three-phase AC reactor according to the embodiment of the present invention includes the input and output terminal block 2, the peripheral iron core 1 disposed under the input and output terminal block 2, and the at least three iron-core coils (1a, 1b, and 1c) each of which is constituted of an iron core and a coil wound around the iron core so as to contact an inner surface of the peripheral iron core 1 or so as to be coupled to the inner surface. The at least three iron-core coils (1a, 1b, and 1c) form gaps that can be magnetically coupled between two of the coils adjoining each other. The method for manufacturing the three-phase AC reactor includes the step of forming the coil extending members (61a, 61b, 61c, 62a, 62b, and 62c) that extend from the coil end portions (13a, 13b, 13c, 14a, 14b, and 14c) as base points to the connection points (21a, 21b, 21c, 22a, 22b, and 22c) of the input and output terminal block. For example, the T-phase coil 1c, i.e., the third coil is bent once (first bending) in a horizontal direction at the coil end portion 14c to form the coil extending member 62c. After that, the coil is further bent once (second bending) in a vertical direction to form the terminal portion 64c. The other component parts (61a, 61b, 61c, 62a, and 62b (see FIG. 11)) of the coil extending member unit 6 can be formed in the same steps.

As shown in FIGS. 12 and 13, in the three-phase AC reactor according to the embodiment of the present invention, the input and output terminal block 2 is connected to the coil extending member unit 6 by screws. FIG. 12 shows a state before fixation by screws, while FIG. 13B shows a state after fixation screws. For example, a hole formed in the third output terminal 22c of the input and output terminal block 2 is aligned with a hole formed in the terminal portion 64c of the coil extending member 62c, and a screw 52c is inserted into the holes. The input and output terminals (21a, 21b, 21c, 22a, and 22b) of the input and output terminal block 2 are connected to the other component parts (61a, 61b, 61c, 62a, and 62b (see FIG. 11)) of the coil extending member unit 6 with screws (51a, 51b, 51c, 52a, and 52b), respectively. An external device is connected to the input and output terminal block 2 with screws (53a, 53b, 53c, 54a, 54b, and 54c).

Figure 14A:
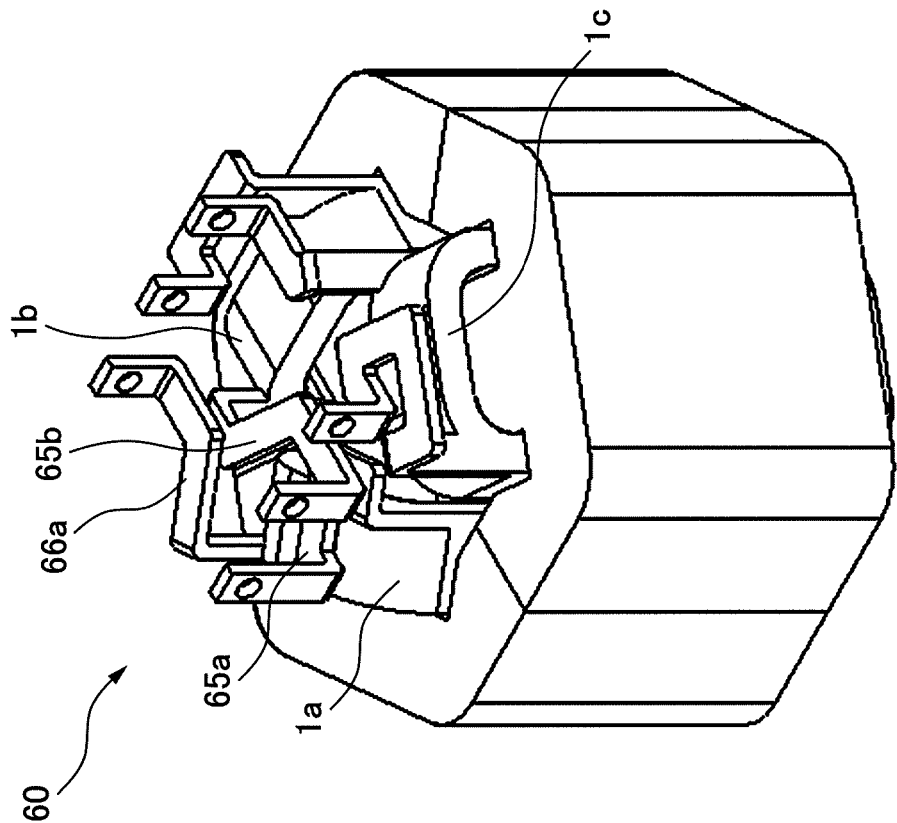
FIG. 14A is a plan view of a coil extending member unit, three-phase coils, and a peripheral iron core that constitute a three-phase AC reactor in which the coil extending member unit partly overlaps.
Figure 14B:
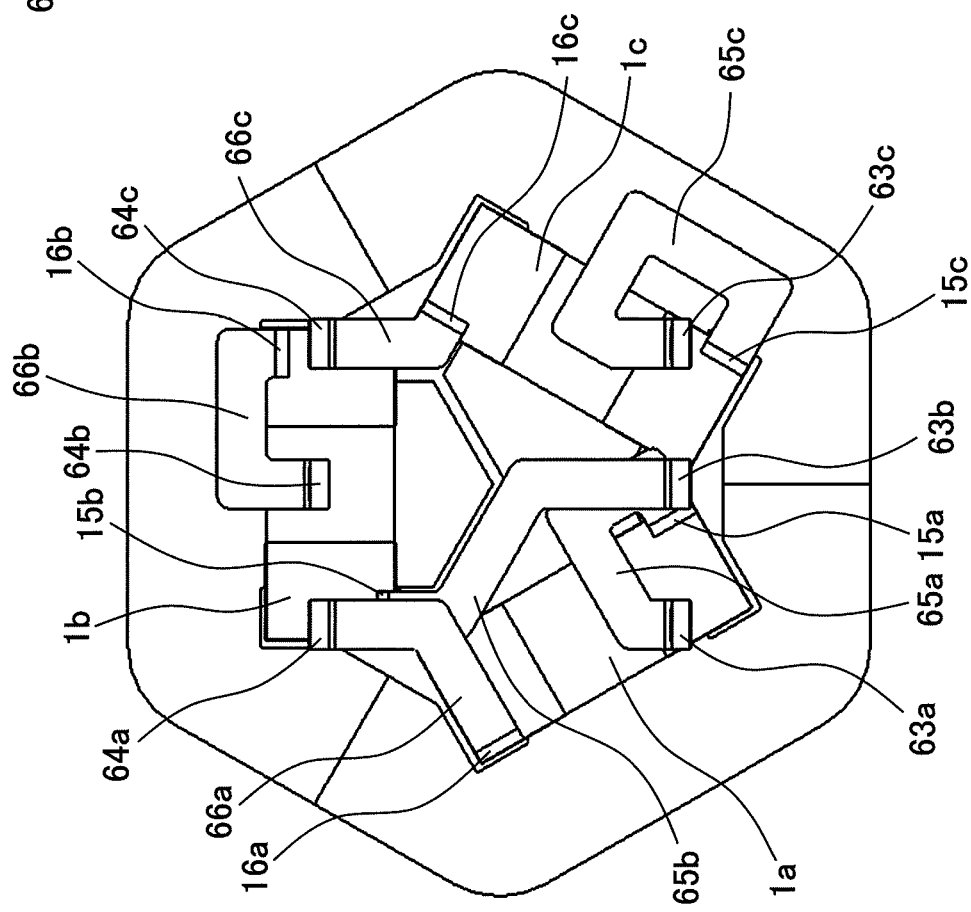
FIG. 14B is a perspective view of the coil extending member unit, the three-phase coils, and the peripheral iron core that constitute the three-phase AC reactor in which the coil extending member unit partly overlaps.
Figure 15:
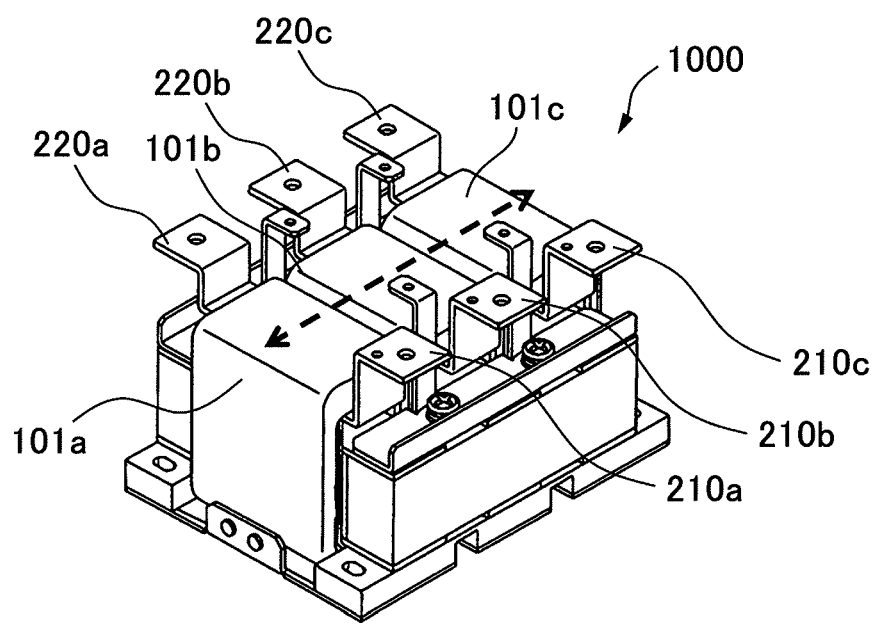
FIG. 15 is a perspective view of a conventional three-phase AC reactor in which three-phase coils are apposed.
Figure 16B:
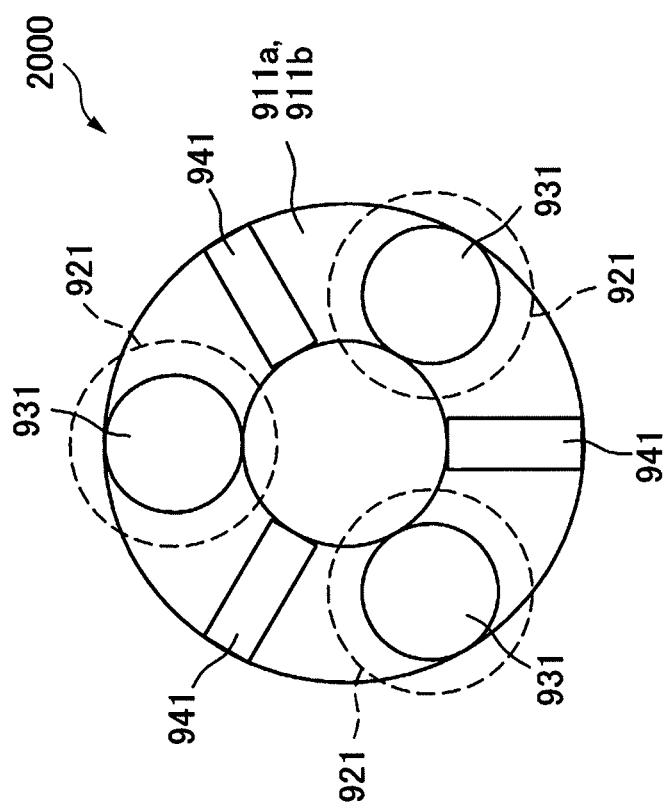
FIG. 16B is a plan view of the conventional three-phase AC reactor in which the three-phase coils are not apposed.
Figure 16A:
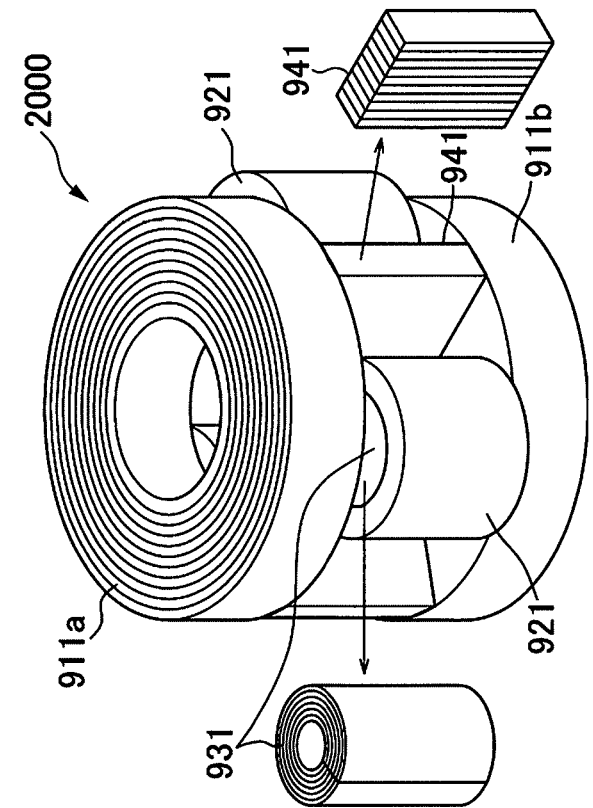
FIG. 16A is a perspective view of a conventional three-phase AC reactor in which three-phase coils are not apposed.

The above describes a structure in which the coil extending members do not overlap. However, the coil extending members may overlap each other. FIGS. 14A and 14B are a plan view and a perspective view of a coil extending member unit, three-phase coils, and a peripheral iron core that constitute a three-phase AC reactor in which the coil extending member unit partly overlaps. In FIGS. 14A and 14B, a partly overlapping coil extending member unit 60 is divided into six component parts, in the case of the three-phase AC reactor. Reference numeral 65a indicates an output coil extending member for an R-phase coil 1a, and reference numeral 66a indicates an input coil extending member for the R-phase coil 1a. Reference numeral 65b indicates an output coil extending member for an S-phase coil 1b, and reference numeral 66b indicates an input coil extending member for the S-phase coil 1b. Reference numeral 65c indicates an output coil extending member for a T-phase coil 1c, and reference numeral 66c indicates an input coil extending member for the T-phase coil 1c. The coil extending members extend from coil ends (15a, 16a, 15b, 16b, 15c, and 16c), respectively.

As shown in FIGS. 14A and 14B, the coil extending member 65b overlaps the other coil extending members 65a and 66a. The combination of the overlapping coil extending members is merely an example, and other coil extending members may overlap each other.

According to the method for manufacturing the three-phase AC reactor of the embodiment of the present invention, in a manufacturing process of the AC reactor having the non-apposed coils on the precondition of automation, the terminal portions of the coil extending member unit can be easily connected to the input and output terminals, thus facilitating the automation of the manufacturing process.

According to the method for manufacturing the three-phase AC reactor of the embodiment of the present invention, it is possible to manufacture a three-phase AC reactor that can be easily connected to an external device with less man-hours, even when the three-phase coils are arranged (apposed) neither in parallel nor in a linear manner.

What is claimed is:
1. A three-phase AC reactor comprising:
an input and output terminal block;
a peripheral iron core disposed under the input and output terminal block;
at least three iron-core coils each constituted of an iron core and a coil wound around the iron core, so as to contact an inner surface of the peripheral iron core or so as to be coupled to the inner surface,
the at least three iron-core coils forming gaps that can be magnetically coupled between two of the iron-core coils adjoining each other; and
a phase-based coil extending member unit that extends the coils from coil end portions of the coils as base points to connection points of the input and output terminal block, wherein the coil extending member unit is arranged in a region corresponding to an end surface of the peripheral iron core, wherein
terminal portions of three input coil extending members are arranged in a first straight line,
terminal portions of three output coil extending members are arranged in a second straight line, and
the first straight line and the second straight line are in parallel, wherein the coil end portions of the coil that is in parallel with the first straight line and the second straight line are disposed in a central area of the three-phase AC reactor and in a third straight line.

2. The three-phase AC reactor according to claim 1, wherein the input and output terminal block is disposed on a radially inner side of the peripheral iron core.

3. The three-phase AC reactor according to claim 1, wherein the first straight line and the second straight line are in parallel with the winding direction of one of the coils.

4. The three-phase AC reactor according to claim 1, wherein which of the two coil end portions of the coil is connected to which of an input connection point and an output connection point of the input and output terminal block is determined such that the sum of distances between each of the two coil end portions and each of the connection points becomes lower.

5. The three-phase AC reactor according to claim 1, wherein the coil extending member unit is bent edgewise.

6. The three-phase AC reactor according to claim 1, wherein coil extending members of each phase are in forms that do not overlap each other.

7. The three-phase AC reactor according to claim 1, wherein the terminal portions of the coil extending members are symmetrical with respect to the third straight line.

8. The three-phase AC reactor according to claim 1, wherein the at least three iron-core coils are made of copper or aluminum.

9. The three-phase AC reactor according to claim 1, wherein the at least three iron-core coils are made from rectangular wires, round wires, or Litz wires.

10. A motor driver comprising the three-phase AC reactor according to claim 1.

* * * * *

UNITED STATES PATENT AND TRADEMARK OFFICE
CERTIFICATE OF CORRECTION

PATENT NO. : 10,685,777 B2  
APPLICATION NO. : 15/711218  
DATED : June 16, 2020  
INVENTOR(S) : Kenichi Tsukada et al.

Page 1 of 1

It is certified that error appears in the above-identified patent and that said Letters Patent is hereby corrected as shown below:

On the Title Page

Add Priority Claim:  
(30) Foreign Application Priority Data:  
Sep. 23, 2016 (JP)....................2016-185583

Signed and Sealed this  
Twenty-second Day of December, 2020

Andrei Iancu  
*Director of the United States Patent and Trademark Office*